United States Patent

[11] 3,540,560

| [72] | Inventor | Frank M. Damico<br>Mishawaka, Indiana |
|---|---|---|
| [21] | Appl. No. | 759,162 |
| [22] | Filed | Sept. 11, 1968 |
| [45] | Patented | Nov. 17, 1970 |
| [73] | Assignee | The Bendix Corporation<br>a corporation of Delaware |

[54] FLUID OPERATED BELLOWS CLUTCH
10 Claims, 9 Drawing Figs.

[52] U.S. Cl. .................................................. 192/88;
188/152; 29/445; 92/42; 192/107
[51] Int. Cl. ........................................................ F16d 25/04
[50] Field of Search............................................ 192/88A;
188/152.87, 72

[56] References Cited
UNITED STATES PATENTS

| 1,135,525 | 4/1915 | Hibbard ....................... | 192/88A |
| 2,138,393 | 11/1938 | Wichtendahl ................ | 192/88A |
| 2,633,697 | 4/1953 | Johnson ....................... | 192/88AX |
| 2,934,178 | 4/1960 | Eaton ........................... | 192/113.2X |

*Primary Examiner*—Benjamin W. Wyche
*Attorney*—Plante, Hartz, Smith & Thompson

ABSTRACT: A frictional engagement mechanism comprised of rotatable members, one carrying a bellows and the other carrying a disc means. The bellows being responsive to a pressurized fluid to cause frictional engagement between said bellows and said disc means.

Patented Nov. 17, 1970

INVENTOR.
FRANK M. DAMICO
BY
Plante, Arens, Hartz and O'Brien
ATTORNEYS

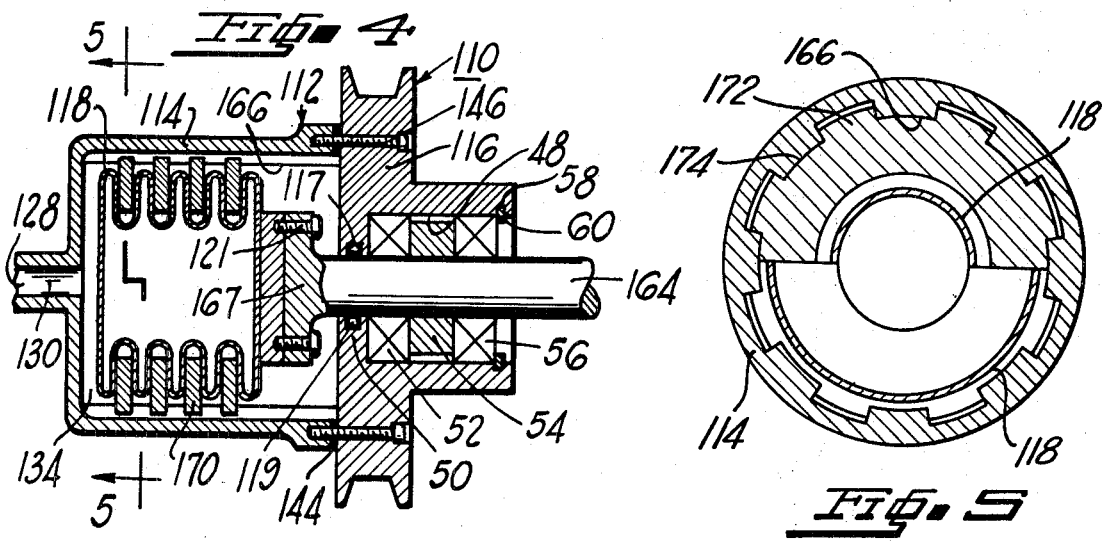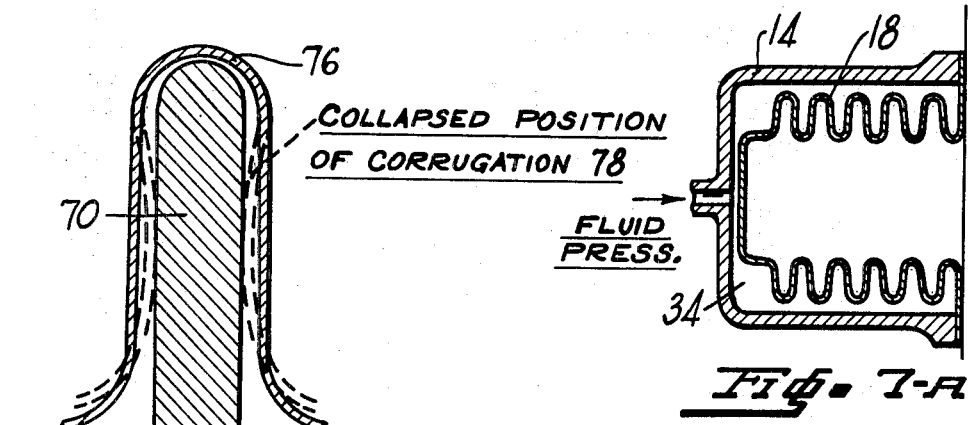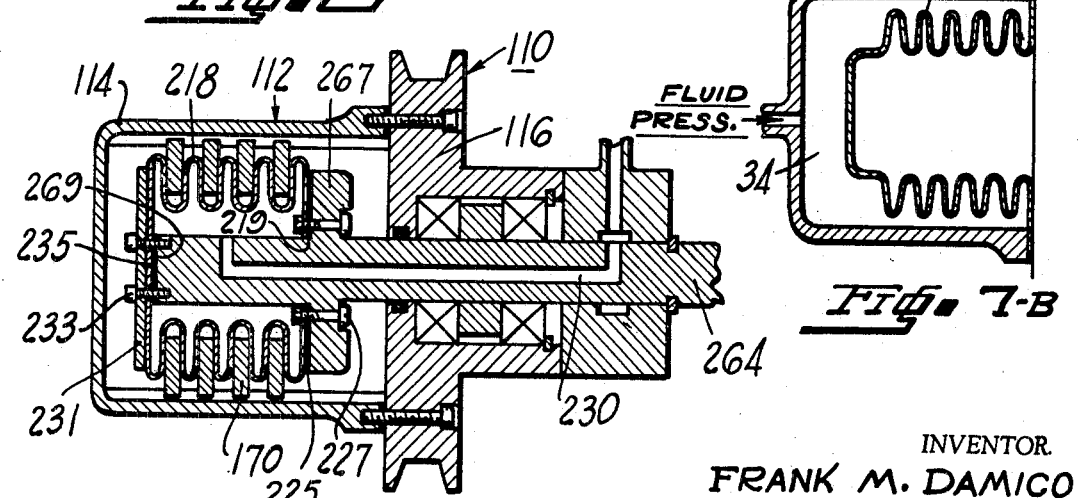

FLUID OPERATED BELLOWS CLUTCH

BACKGROUND OF THE INVENTION

The invention concerns an improvement to frictional engagement mechanisms of the variety generally used in association with clutching or braking applications of reasonably low to medium torque requirements. However, it is felt that the concept of the invention may be used for any application where frictional engagement of rotatable means is required.

The conventional frictional engagement mechanisms with which I am familiar consist mainly of sophisticated mechanical schemes and having numerous working parts. Moreover, the complications of the designs result in high initial manufacturing costs. Thus, these design concepts are not readily adaptable to applications that do not require sophistication, and further, which cannot bear the cost inherent in such a design.

SUMMARY OF THE INVENTION

It is an object of this invention to provide a frictional engagement mechanism of relatively simple construction that employs a fluid-responsive bellows as one of the friction elements.

It is another object of this invention to provide a frictional engagement mechanism that has a fast frictional engagement response time.

It is another object of this invention to provide a frictional engagement mechanism that has superior resistance to contamination.

It is another object of this invention to provide a frictional engagement mechanism that is easily actuated.

It is another object of this invention to provide a frictional engagement mechanism by an improved and simplified method of manufacture.

It is still another object of this invention to provide a frictional engagement mechanism that is lightweight, low cost and readily adaptable to a variety of applications.

Other objects and features of the invention will be apparent from the following description of the frictional engagement mechanism taken in connection with the accompanying drawings.

BRIEF DESCRIPTION OF THE DRAWINGS

FIG. 4 is a sectional schematic, illustrating a modified form of the invention depicted in FIG. 1;

FIG. 5 is a sectional view taken on line 5-5 of FIG. 4;

FIG. 6 is a fragmented sectional schematic similar to FIG. 4, showing an alternate mounting of the bellows;

FIG. 7 depicts sectional views of the bellows being operatively connected on one end only, FIG. 7A showing the non-compressed state and FIG. 7B showing the compressed state of said bellows; and FIG. 8 is an enlarged sectional view of one corrugation of a bellows, being operatively connected on both ends, that illustrates compressability characteristics of said bellows.

DESCRIPTION OF THE PREFERRED EMBODIMENTS

Figure 1:
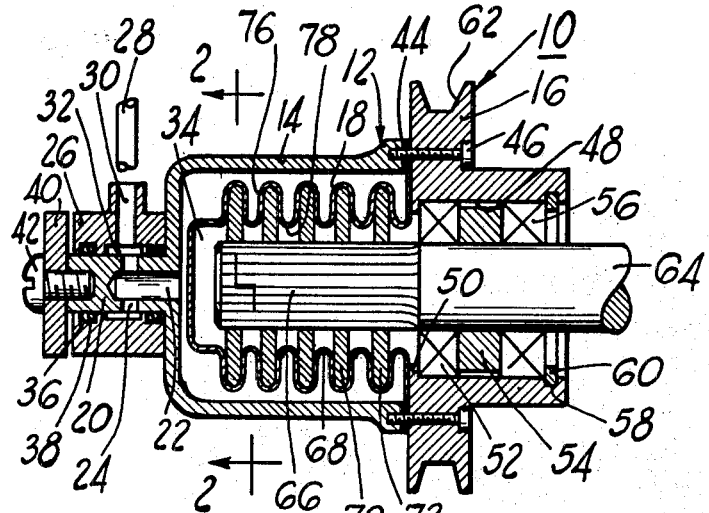
FIG. 1 is a sectional schematic of the elements comprising the frictional engagement mechanism.
Figure 2:
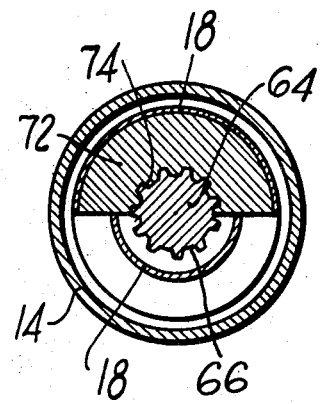
FIG. 2 is a sectional view taken on line 2-2 of FIG. 1.

Referring now to FIGS. 1 and 2, the device illustrated represents a frictional engagement mechanism which is generally referred to by the numeral 10. The frictional engagement mechanism 10 could be used to accomplish either a clutching or a braking function depending upon its intended application, the details of which will vary in accordance with requirements. The frictional engagement mechanism 10 includes a first rotatable member or housing 12 which is comprised of a cover means 14 and a pulley member 16. The cover means 14 has disposed therein and operatively connected thereto a bellows 18. The cover 14 further includes an axial projection 20 having therein an axial passage 22. A plurality of passages 24 communicate with and extend radially from axial passage 22. A collar member 26 is suitably installed around the periphery of the axial projection 20. Collar member 26 has a fluid inlet 28, a passage 30 and an annular conduit 32 for communicating a pressurized fluid through passages 24 and 22 and thus into a fluid chamber 34 defining the area intermediate the bellows 18 and the cover means 14. The collar member 26 further has annular grooves 36 for receiving O-ring seals 38 to preclude leakage of the pressurized fluid between the collar member 26 and the axial projection 20. A cap 40 and a screw 42 are suitably installed on the end of the axial projection 20 to maintain collar member 26 in its proper relationship with respect to passages 24. It is important to note that the bellows 18 may be constructed of metal strong enough to serve as one of the friction elements while remaining sufficiently flexible to respond to said pressurized fluid.

The first rotatable member or housing 12 is further assembled by inserting a gasket 44 intermediate the bellows 18 and the cover means 14. The pulley member 16 is suitably secured to the cover means 14 by bolts 46 so as to create a fluid pressure seal between the bellows 18 and the cover means 14. As may be seen by those skilled in the art, the first rotatable member or housing 12 could be rotatably carried by another member to provide for rotational freedom of said housing 12.

The pulley member 16 further includes a bore 48 and a ledge 50. A first annular bearing member 52 is disposed in bore 48 and abuts ledge 50. A separating member 54 is installed in the bore 48 so as to axially abut the first annular bearing member 52 on one end and a second annular bearing member 56 on its other. The bore 48 further includes an annular groove 58 which receives a C-ring retainer 60 to limit axial movement of the bearing members 52 and 56 and the separating member 54. It is further noted that the pulley member 16 has an annular V-shaped groove 62 around its outermost periphery for engagement with a pulley belt, not shown.

A second rotatable member or shaft 64 having a serrated end 66 is rotatably carried by said annular bearing members 52 and 56. The serrated end 66 extends axially into the bellows 18 and has a concentric relationship with the corrugations 68 of the bellows 18. The serrated end 66 has operatively connected thereto a disc means 70 which projects radially from the shaft 64 intermediate the corrugation 68. The disc means 70 is comprised of a plurality of discs 72 each having a serrated bore 74 for cooperation with serrated end 66 of the shaft 64, as best seen in FIG. 2. It is noted that the individual discs are reasonably free to slide with respect to the shaft 64; however, the serrations of the discs and the shaft preclude rotational slippage of the disc 72 with respect to the shaft 64. It is important to note that the discs 72 may be made of nylon or other plastic material as well as the conventional metals or friction materials used for friction elements. As mentioned above, the bellows 18 is responsive to a pressurized fluid so as to frictionally engage the disc means 70. Each of the corrugations 68 has a ridge 76 and a valley 78; which, when subjected to the pressurized fluid, flexes and partially collapses the bellows 18 to move it toward the right as seen in FIG. 1, which, in turn, frictionally engages the discs 72 by sandwiching them intermediate the corrugations.

A method of making the frictional engagement mechanism 10 and specifically the disc means 70 comprised of a plurality of discs 72 includes the following steps: installation in the housing 12 of the bellows 18 having radially inwardly extending corrugations 68 whose ridges 76 define a bore; inserting in said bore a core having a concentric relationship with said bore; injecting a friction disc material intermediate said core and said corrugations 68; employing means for solidifying said friction disc material of which said discs 72 are made; removing said core from said bore; broaching the serrated axial bore 74 in said disc means 70; machining said friction disc material to form said plurality of discs 72; and inserting shaft 64 having serrated end 66 into said serrated bore 74.

Figure 3:
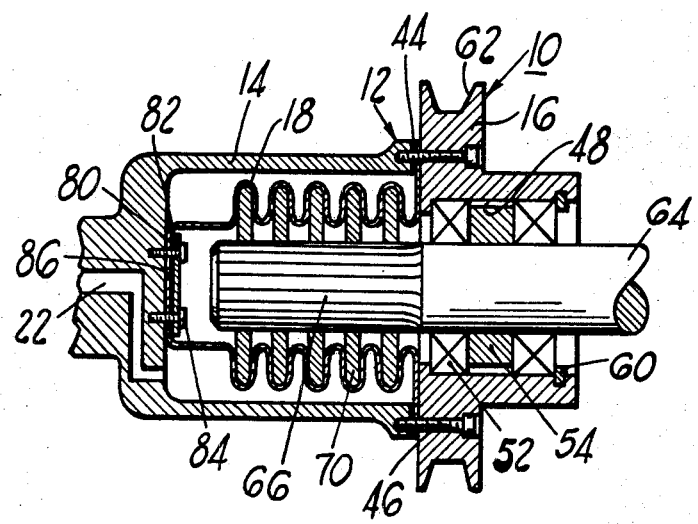
FIG. 3 is a fragmented sectional schematic similar to FIG. 1, showing an alternate mounting of the bellows.

With reference to FIG. 3, those parts which are identical to corresponding parts of the device shown in FIG. 1 will be given the same identifying number.

In the embodiment of FIG. 3, a gasket 80, a plate 82 and a plurality of bolts 84 are used to secure an end 86 of bellows 18 to the cover means 14. As can be further seen from the drawing, the axial passage 22 has been rerouted slightly to allow it to vent into fluid chamber 34. By mounting both ends of the bellows 18 to the cover means 14 additional torque can be transmitted from the disc means 70 to the bellows 18 upon frictional engagement of said elements.

It is important to note that the disc means 70 used in association with the frictional engagement mechanism 10 shown in FIG. 3 need not be separated into the plurality of discs 72. In this embodiment, the bellows 18 in response to the pressurized fluid will not displace itself axially to the right as was the case in FIG. 1, but rather, the corrugations 68 will maintain their axial position and collapse as shown by the dashed outline in FIG. 8, to frictionally engage the disc means 70.

Another modified form of the invention is shown in FIGS. 4 and 5. Those parts which are identical to the corresponding parts of the embodiment depicted in FIG. 1, will be given the same identifying numbers. Those parts of FIGS. 4 and 5 having corresponding parts in FIG. 1 which are of different construction, size or shape will be given the same number as its counterpart with the number 100 added thereto.

Referring now to FIGS. 4 and 5, the device shown represents a frictional engagement mechanism generally referred to by the numeral 110. The frictional engagement mechanism 110 includes a first rotatable member or housing 112 being comprised of a cover means 114 and a pulley member 116. The cover means 114 has a serrated bore 166 for receiving disc means 170 being comprised of a plurality of discs 172 each having a serrated outer periphery 174. Cover means 114 further includes a fluid inlet 128 and passage 130 for communicating said pressurized fluid to the fluid chamber 134 being defined by the cover means 114 and the pulley member 116. A gasket 144 is inserted intermediate the cover means 114 and the pulley member 116 to insure a fluid seal at that point when the bolts 146 are inserted and tightened to secure the pulley member 116 to the cover means 114.

The pulley member 116 has therein a bore 48 and ledge 50 for receiving said first and second bearing members 52 and 56 and said separating member 54. The bore 48 further has an annular groove 58 for receiving the C-ring retainer 60 for limiting the axial movement of said members 52 and 56 and said separating member 54. As can be seen from the drawing, the retention of the annular bearing and separating members in the pulley member 116 is structurally and functionally identical to that shown in FIG. 1.

The frictional engagement mechanism 110 further includes a second rotatable member or shaft 164 which is rotatably carried by the pulley member 116. The pulley member 116 further includes an annular groove 117 which receives an annular O-ring seal 119 for precluding pressure leaks intermediate said pulley member 116 and said second rotatable member or shaft 164. The second rotatable member or shaft 164 has on one end a flange 167 which is operatively connected to bellows 118 by bolts 121.

As will be seen by those skilled in the art, the structural and functional relationship between the bellows 118 and the disc means 170 is so similar to that shown and explained in association with FIG. 1 that further explanation is not warranted.

In the embodiment shown in FIG. 6, those parts which are identical to the corresponding parts of the embodiment depicted in FIG. 4 will be given the same identifying members. Those parts of FIG. 6 having corresponding parts in FIG. 4 which are of different construction, size, or shape will be given the same number as its counterpart with 100 added thereto.

Referring now specifically to FIG. 6, a second rotatable member or shaft 264 has a flange 267 and end 269 to support a bellows 218 at both ends. The bellows 218 has an opening 219 at one end which slides over the axial extension of the shaft 264. Holes are provided around the periphery of the opening for cooperation with a gasket 225 to seal said bellows 218 to said flange 267 by means of bolts 227 and nuts 229, permanently secured to said bellows 218. The other end of the bellows 218 is provided with a plurality of holes which cooperate with plate 231 and bolts 233 for operatively connecting said bellows 218 to the shaft 264. The gasket 235 may be placed intermediate bellows 218 and the end 269 of shaft 264 to further insure against pressurized fluid leakage at that point. It is noted that pressurized fluid is provided internal to said bellows 218 by means of passage 230 to cause frictional engagement between said bellows and the disc means 170. As may be seen from the drawing, the remaining structure is a combination of the prior structure hereinabove recited and functionally described, and therefore, needs no further explanation.

MODE OF OPERATION OF THE PREFERRED EMBODIMENTS

Assume that the frictional control mechanism 10 shown in FIG. 1 is being used in a clutching application wherein the second rotatable member or shaft 64 is the driver element and the first rotatable or housing 12 is the driven element.

It is noted that either the first or second rotatable members, 12 or 64 may be rotatably carried by one of the numerous conventional means available, but not shown.

It is further assumed that the second rotatable member 64, which carries on its serrated end 66 the discs 72, is rotating. In the absence of pressurized fluid being applied to the fluid inlet 28 and communicated to the fluid chamber 34, the bellows 18 will not be compressed so as to engage the discs 72 as may best be seen in FIG. 7A. Thus, the first rotatable member or housing 12 will remain static while said second rotatable member or shaft 64 is rotating.

Upon pressurization of said fluid being provided to the fluid inlet 28, the fluid chamber 34 will be pressurized so as to compress or collapse the corrugations 68 of the bellows 18, thus moving the bellows 18 to the right as best seen in FIG. 7B. The compression of the bellows 18 will cause the corrugations 68 to frictionally engage the rotating discs 72. As can be seen in the drawing, the compression of the bellows 18 toward the right will cause a limited axial displacement of the disc 72 to the right, until complete frictional engagement therebetween is achieved. Frictional engagement of the bellows 18 and discs 72 will cause the first rotatable member 12 to be driven in response to the rotation of said second rotatable member 64.

With reference now to FIG. 3, the mode of operation thereof is substantially identical to that described for FIG. 1; however, it is noted that the bellows 18 is operatively secured at both ends to the cover means 14. Thus, frictional engagement between the bellows 18 and the disc means 70 will not cause axial displacement of said discs but will rather be accomplished in the manner shown in FIG. 8. As can be seen from the drawing, the pressurized fluid will cause axial deflection of the corrugations 68 so as to engage said discs 72 primarily intermediate their innermost and outermost peripheries.

With reference now to FIGS. 4 and 6, the structural and functional relationships between the bellows and discs are substantially identical to that hereinabove explained and need no further description of operation.

While this invention has been described in connection with certain specific embodiments, it will be obvious to those skilled in the art that various changes may be made in the form, structure, and arrangement of components without departing from the spirit and scope of the invention.

I claim:

1. A frictional engagement mechanism comprising:
   rotatable members having a concentric relationship with one being rotatably carried by the other;
   a bellows operatively connected to one of said members and having a plurality of radially extending corrugations with a distance between sides of said corrugations;

disc means operatively connected to the other of said members for engagement with said corrugations; and said bellows being responsive to a pressurized fluid to change said distance between the sides of said corrugations, said change causing said sides to clamp said disc means thereby causing said members to rotate together.

2. A frictional engagement mechanism as recited in claim 1, wherein said rotatable members comprise:

a housing having connected thereto said bellows; and a shaft means rotatably carried by said housing and having said disc means connected thereto.

3. Rotatable members as recited in claim 2, wherein said shaft means has a serrated portion for receiving said disc means.

4. A frictional engagement mechanism as recited in claim 1, wherein said disc means is comprised of a plurality of discs axially disposed intermediate said corrugations.

5. Disc means as recited in claim 4, wherein said discs each have a serrated bore.

6. Disc means as recited in claim 4, wherein said discs are each comprised of two or more segments.

7. A frictional engagement mechanism as recited in claim 1, wherein said rotatable members comprise:

a housing having connected thereto said disc means; and a shaft means rotatably carried by said housing and having connected thereto said bellows.

8. Rotatable members as recited in claim 7 wherein said housing is provided with slots and said disc means is provided with projections slidably engaged with said slots to permit axial movement of said disc means relative to said housing.

9. A frictional engagement mechanism as recited in claim 1, wherein said bellows are metal.

10. A frictional engagement mechanism comprising:

a driving member and a driven member having a concentric relationship therebetween;

a bellows operatively connected to one of said members and having a plurality of radially extending corrugations with a distance between sides of said corrugations;

disc means operatively connected to the other of said members for engagement with said corrugations; and said bellows being responsive to a pressurized fluid to change said distance between the side of said corrugations, said change causing said sides to clamp said disc means thereby causing said driving and driven members to rotate together.